(12) United States Patent
Saito et al.

(10) Patent No.: US 7,038,146 B2
(45) Date of Patent: May 2, 2006

(54) FIXING DEVICE INCLUDING A SCREW ARRANGED WITH CLEARANCE IN A FIXING HOLE, AND A WEIGHT MEASURING APPARATUS USING THE SAME

(75) Inventors: Kiyoshi Saito, Osaka (JP); Shusaku Kawasaki, Osaka (JP); Shigehiro Yoshiuchi, Osaka (JP); Tsuyoshi Tanaka, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 98 days.

(21) Appl. No.: 10/488,947

(22) PCT Filed: Jul. 23, 2003

(86) PCT No.: PCT/JP03/09313

§ 371 (c)(1),
(2), (4) Date: Mar. 9, 2004

(87) PCT Pub. No.: WO2004/018979

PCT Pub. Date: Mar. 4, 2004

(65) Prior Publication Data

US 2005/0016777 A1 Jan. 27, 2005

(30) Foreign Application Priority Data

Aug. 26, 2002 (JP) .............................. 2002-244701

(51) Int. Cl.
*B60R 21/16* (2006.01)
*G01G 21/00* (2006.01)

(52) U.S. Cl. ................. 177/136; 177/144; 177/DIG. 9; 180/273; 280/735

(58) Field of Classification Search ................ 177/136, 177/144, DIG. 9; 180/273; 280/735
See application file for complete search history.

(56) References Cited

U.S. PATENT DOCUMENTS

| 5,111,896 A | * | 5/1992 | Porcari et al. ................. 177/16 |
| 5,600,104 A | * | 2/1997 | McCauley et al. ........... 177/136 |
| 6,340,799 B1 | * | 1/2002 | Hama et al. .................. 177/238 |
| 6,571,647 B1 | * | 6/2003 | Aoki et al. ............ 73/862.381 |
| 6,677,539 B1 | * | 1/2004 | Miura et al. ................. 177/136 |
| 6,969,809 B1 | * | 11/2005 | Rainey ........................ 177/136 |

FOREIGN PATENT DOCUMENTS

| EP | 0 990 565 | 4/2000 |
| JP | 9-150662 | 6/1997 |
| JP | 11-1153 | 1/1999 |
| JP | 11-295162 | 10/1999 |

* cited by examiner

*Primary Examiner*—Randy W. Gibson
(74) *Attorney, Agent, or Firm*—Wenderoth, Lind & Ponack, L.L.P.

(57) ABSTRACT

According to a fixing device of the present invention, a screw penetrates through a first fixing hole of a first fixing section and a second fixing hole of a second fixing section to be coupled with a weight measuring machine, and is tightened with a nut, so that the first fixing section is fixed to the second fixing section. In addition, at least one clearance of the first fixing hole and the second fixing hole is configured to be bigger than an assembly tolerance of the two fixing holes. Using this structure, the fixing device, which can accommodate constructive variations of the fixing section of the weight measuring machine and maintain excellent detecting accuracy, and a weight measuring apparatus using the same, can be provided.

19 Claims, 6 Drawing Sheets

FIXING DEVICE INCLUDING A SCREW ARRANGED WITH CLEARANCE IN A FIXING HOLE, AND A WEIGHT MEASURING APPARATUS USING THE SAME

TECHNICAL FIELD

The present invention relates to a fixing device for fixing a weight measuring machine which measures weight of an object, and a weight measuring apparatus using the same.

BACKGROUND ART

Recently, to improve efficiency of a safety system of a vehicle, a method for measuring weight of an occupant, e.g., a crew member or a passenger, of the vehicle using a seat weight measuring apparatus has been under development for controlling motion of the safety system. The safety system mentioned above denotes a seat belt, an airbag or the like. For example, Japanese Patent Unexamined Publication H11-1153 discloses weight measuring apparatuses which are positioned at four corners of seat rails and measure seat weight to determine the weight of an occupant.

However, even if the conventional weight measuring apparatus itself has high accuracy, when a load is applied, friction tends to occur in a vertical motion because of a positional deviation or a surface slope at a fixing section. As a result, detecting accuracy is conspicuously reduced because of a transmission loss, which is caused by the friction, of the load.

SUMMARY OF THE INVENTION

According to a fixing device of a weight measuring apparatus of the present invention, a screw penetrates through one fixing hole provided at one fixing section of a side of an object to be measured and the other fixing hole provided at the other fixing section to be coupled with a weight measuring machine, and is tightened with a nut, so that the one fixing section is fixed to the other fixing section. In addition, at least one clearance of the two fixing holes is configured to be bigger than a shaft of the screw by more than an assembly tolerance of the two fixing holes.

DETAILED DESCRIPTION OF THE PREFERRED EMBODIMENTS

The exemplary embodiments of the present invention are demonstrated hereinafter with reference to the accompanying drawings. In the respective embodiments, elements similar to those in a previous embodiment have the same reference marks as those in the previous embodiment, and detailed descriptions thereof are omitted.

First Exemplary Embodiment

Figure 1A:
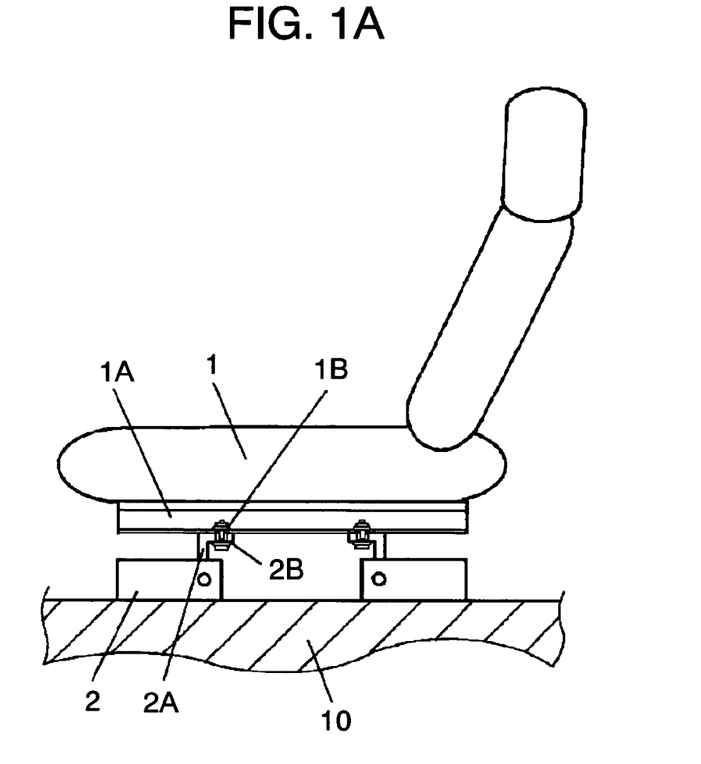
FIG. 1A is an overall view of a seat weight measuring apparatus in accordance with a first exemplary embodiment of the present invention.
Figure 1B:
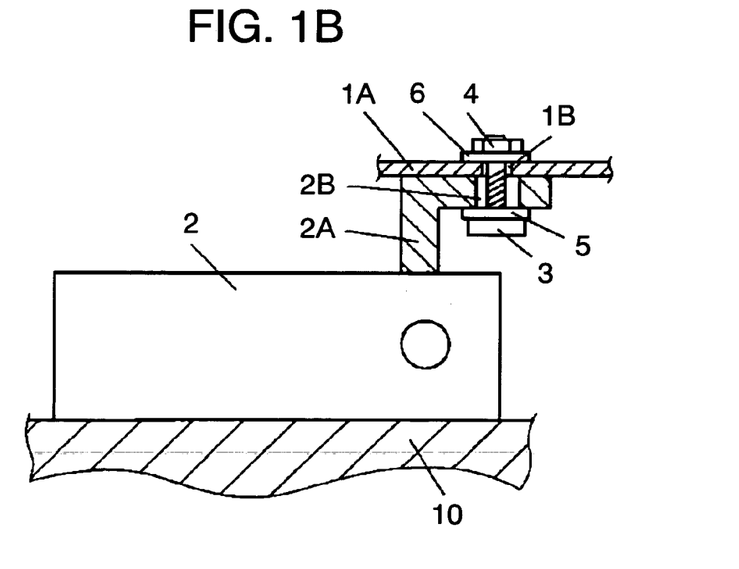
FIG. 1B shows a structure of a fixing device in accordance with the first exemplary embodiment of the present invention.
Figure 2:
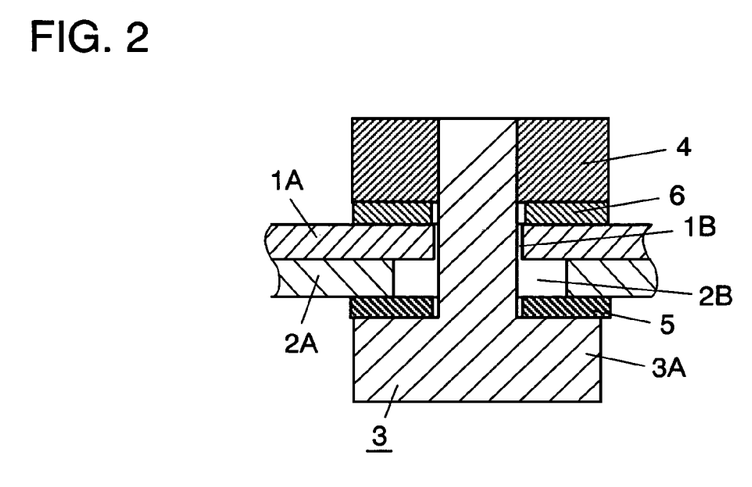
FIG. 2 is a sectional detail view of the fixing device in accordance with the first exemplary embodiment of the present invention.

FIG. 1A is an overall view of a seat weight measuring apparatus in accordance with the first exemplary embodiment of the present invention. FIG. 1B shows a structure of a fixing device in accordance with the first exemplary embodiment of the present invention. FIG. 2 is a sectional detail view of the fixing device. As shown in FIGS. 1A and 1B, seat 1 for a vehicle (hereinafter referred to as "seat 1") is fixed to weight measuring machine 2 through first fixing section 1A (hereinafter referred to as "fixing section 1A") and second fixing section 2A (hereinafter referred to as "fixing section 2A"). Fixing section 1A has first fixing hole 1B (hereinafter referred to as "fixing hole 1B"), and fixing section 2A has second fixing hole 2B (hereinafter referred to as "fixing hole 2B"). Screw 3 penetrates through fixing holes 1B and 2B, and is tightened with nut 4 via spacers 5 and 6, so that fixing section 1A is fixed to fixing section 2A. Spacer 6 is placed between nut 4 and fixing section 1A, and spacer 5 is placed between head 3A of screw 3 and fixing section 2A. Weight measuring machine 2 is disposed on vehicle body 10.

Weight measuring machine 2 is formed of an apparatus such as a load cell which changes a load into an electric signal. Fixing sections 1A and 2A, screw 3, nut 4 and spacers 5 and 6 are made of metal, resin material, ceramic material or the like, which have certain mechanical strengths. In FIG. 2, fixing hole 2B has a clearance bigger than an assembly tolerance of fixing holes 1B and 2B.

A method of assembling these components mentioned above is described hereinafter. Screw 3, which penetrates through spacer 5, is inserted into fixing hole 2B formed at fixing section 2A of weight measuring machine 2. Then, screw 3 penetrates through fixing hole 1B formed at fixing section 1A of seat 1, and is tightened with nut 4 via spacer 6. After that, weight measuring machine 2 is fixed to vehicle body 10.

An operation of the fixing device is described hereinafter. When an occupant, e.g., a crew member or a passenger, of a vehicle sits on seat 1, a load is applied through fixing section 2A to weight measuring machine 2, and a signal corresponding to the weight of the occupant is output.

At this time, if fixing hole 1B is forced to be fixed to fixing hole 2B in a condition that fixing hole 1B positionally deviates from fixing hole 2B, constructive flexibility decreases. Therefore, when seat 1 is displaced in a direction of sinking, i.e., downward, by the weight of the occupant, a twist (torque) is generated so that fixing section 1A and fixing section 2A may scoop out each other. A transmission loss of the load is generated by friction force of the twist, so that detecting accuracy is reduced.

On the contrary, as shown in FIG. 2, in a case where fixing hole 2B has a clearance bigger than an assembly tolerance of fixing holes 1B and 2B, even when a positional deviation occurs, fixing hole 1B is not forced to be fixed to fixing hole 2B. As a result, a transmission loss of the load caused by the twist mentioned above is not generated, so that detecting accuracy is not reduced. In other words, the clearance accommodates constructive variations of the fixing section, so that excellent detecting accuracy is maintained.

Figure 3:
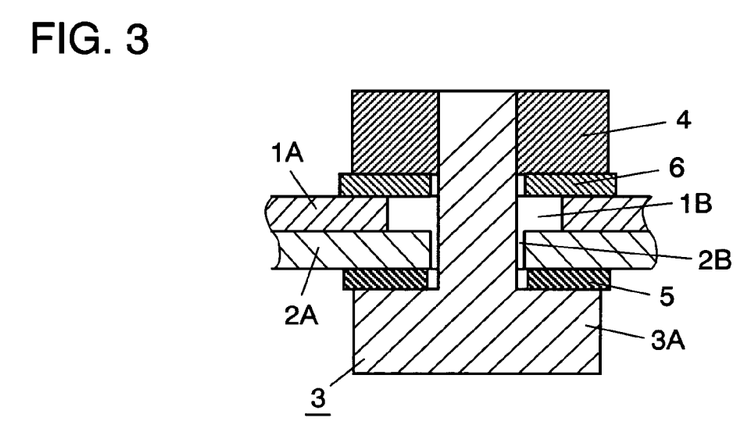
FIG. 3 is a sectional detail view of another fixing device in accordance with the first exemplary embodiment of the present invention.

In addition, as shown in FIG. 3, fixing hole 1B may have a clearance bigger than an assembly tolerance of fixing holes 1B and 2B. In this case, an effect similar to that in FIG. 2 can be obtained.

Alternatively, screw 3 may be inserted into spacer 6, and penetrate fixing hole 1B, fixing section 2A and spacer 5, in that order. Then, screw 3 may be tightened with nut 4. In short, positions of screw 3 and nut 4 can be switched with each other.

Second Exemplary Embodiment

Figure 4:
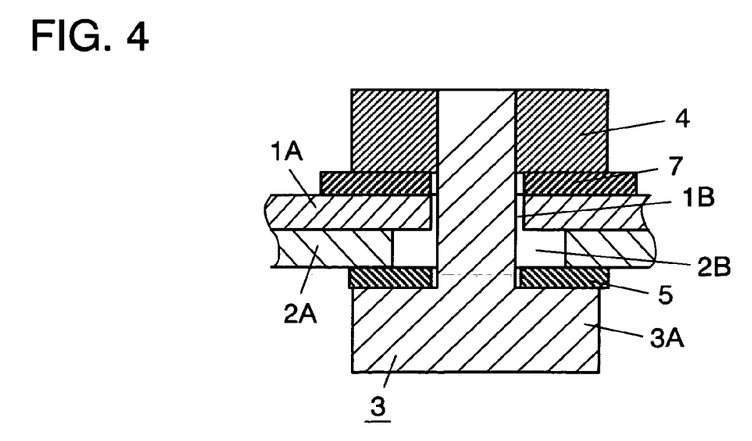
FIG. 4 is a sectional detail view of a fixing device in accordance with a second exemplary embodiment of the present invention.

FIG. 4 is a sectional detail view of a fixing device in accordance with the second exemplary embodiment of the present invention. This embodiment differs from the first embodiment in that elastic body 7 instead of spacer 6 is inserted between fixing section 1A and nut 4. Elastic body 7 is made of rubber, metal mesh, and resin having viscoelasticity or the like. The structures other than elastic body 7 are identical with those shown in FIG. 2 of the first embodiment.

An operation of the fixing device is described hereinafter. Similar to the first embodiment, second fixing hole 2B (hereinafter referred to as "fixing hole 2B") has a clearance bigger than an assembly tolerance of first fixing hole 1B (hereinafter referred to as "fixing hole 1B") and fixing hole 2B. Therefore, even when a positional deviation occurs, fixing hole 1B is not forced to be fixed to fixing hole 2B. As a result, a transmission loss caused by a twist is not generated, so that detecting accuracy is not reduced. In addition, even when there is a slight angle between fixing hole 1B and fixing hole 2B, elastic deformation of elastic body 7 accommodates the angle. As a result, generation of the twist is restrained, and a transmission loss of a load caused by friction force of the twist is not generated, so that detecting accuracy is not reduced.

In this embodiment, elastic body 7 is preferably made of rubber. Elastic body 7 is easy to adapt to the insertion part by using rubber, so that unnecessary clearance play is accommodated and stability for fixing improves.

Figure 5:
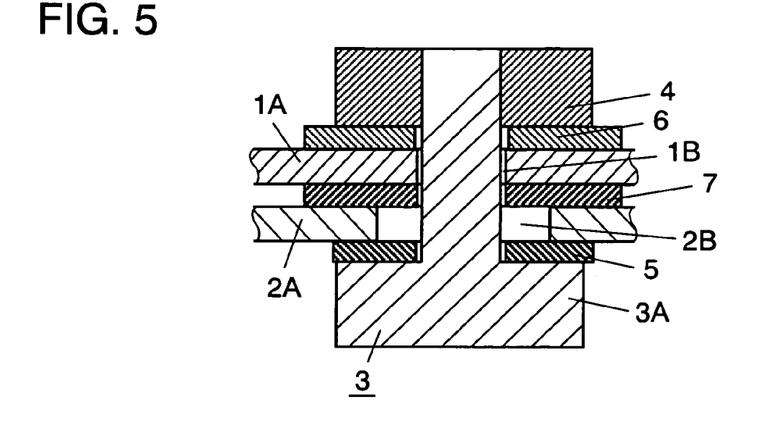
FIG. 5 is a sectional detail view of another fixing device in accordance with the second exemplary embodiment of the present invention.
Figure 6:
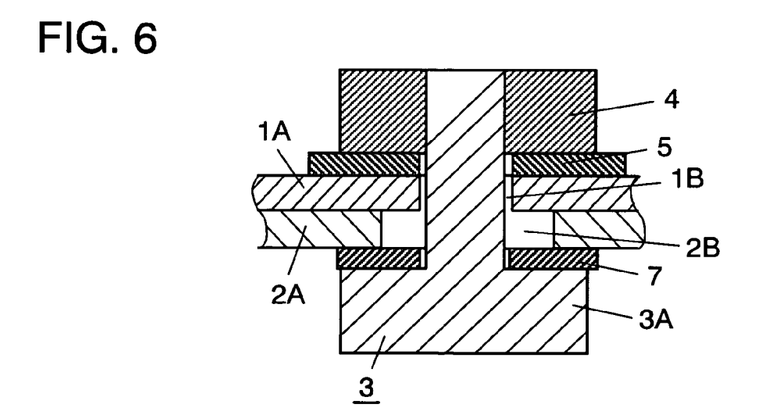
FIG. 6 is a sectional detail view of still another fixing device in accordance with the second exemplary embodiment of the present invention.

As shown in FIG. 5, in addition to the structure shown in FIG. 1 of the first embodiment, elastic body 7 may be placed between fixing sections 1A and 2A. Furthermore, as shown in FIG. 6, instead of spacers 5 shown in FIG. 1 of the first embodiment, elastic body 7 may be disposed between head 3A of screw 3 and fixing section 2A. A plurality of elastic bodies 7 may be disposed between any adjacent two elements selected from head 3A of screw 3, fixing section 2A, fixing section 1A and nut 4 (these structures are not shown in the drawings). A similar effect can be obtained even when a position in which elastic body 7 is inserted is changed. Besides, in all cases mentioned above, elastic body 7 can be adapted to the structures shown in FIGS. 2 and 3 of the first embodiment.

Third Exemplary Embodiment

Figure 7:
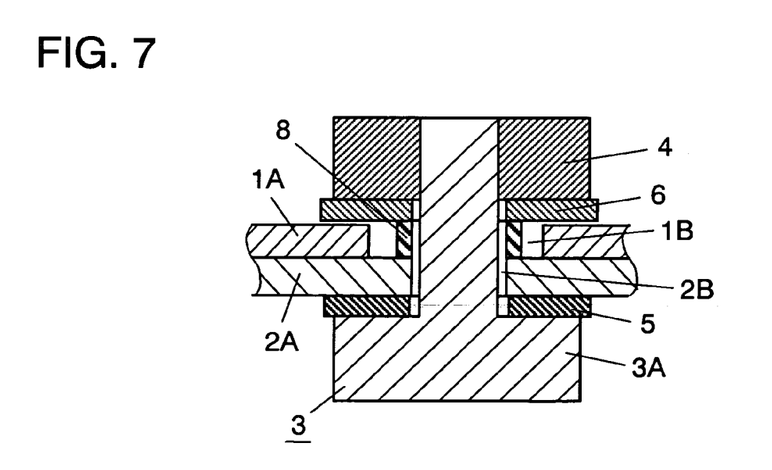
FIG. 7 is a sectional detail view of a fixing device in accordance with a third exemplary embodiment of the present invention.

FIG. 7 is a sectional detail view of a fixing device in accordance with the third exemplary embodiment of the present invention. The third embodiment differs from the first embodiment in that bushing 8 is inserted in first fixing hole 1B (hereinafter referred to as "fixing hole 1B"). Bushing 8 is smaller than fixing hole 1B in diameter, and thicker than first fixing section 1A. Other structures are identical with those shown in FIG. 2 of the first embodiment. Bushing 8 is made of metal, resin material, ceramic material or the like, which have certain mechanical strengths.

An operation of the fixing device is described hereinafter. Similar to the first embodiment, fixing hole 1B has a clearance bigger than an assembly tolerance of fixing hole 1B and fixing hole 2B. Therefore, even when a positional deviation occurs, fixing hole 1B is not forced to be fixed to fixing hole 2B. As a result, a transmission loss caused by a twist is not generated, so that detecting accuracy is not reduced. In addition, a clearance is generated between spacer 6 and first fixing section 1A by using bushing 8. Therefore, even when there is a slight angle between fixing hole 1B and fixing hole 2B, the clearance restrains generation of a twist caused by the angle. As a result, a transmission loss of a load caused by friction force of the twist is not generated, so that detecting accuracy is not reduced.

Figure 8:
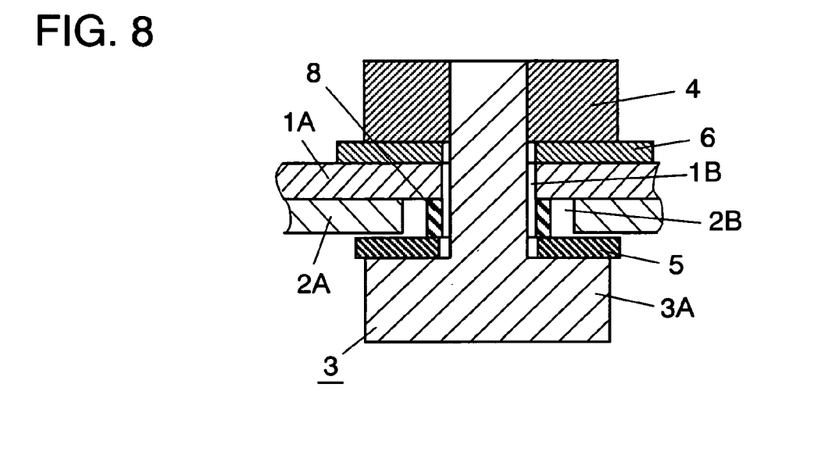
FIG. 8 is a sectional detail view of another fixing device in accordance with the third exemplary embodiment of the present invention.

Besides, as shown in FIG. 8, bushing 8, which is smaller than fixing hole 2B in diameter and thicker than fixing section 2A, may be inserted in fixing hole 2B. Using the structure mentioned above, a clearance is generated between spacer 5 and second fixing section 2A, so that similar effects can be obtained.

Fourth Exemplary Embodiment

Figure 9:
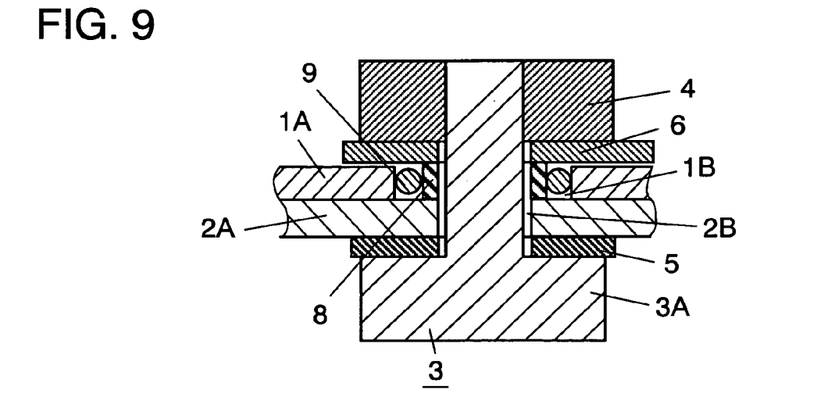
FIG. 9 is a sectional detail view of a fixing device in accordance with a fourth exemplary embodiment of the present invention.

FIG. 9 is a sectional detail view of a fixing device in accordance with the fourth exemplary embodiment of the present invention. The fourth embodiment differs from the third embodiment in that rubber ring 9 is inserted outside bushing 8. Other structures are identical with those described in the third embodiment.

An operation of the fixing device is described hereinafter. First fixing hole 1B (hereinafter referred to as "fixing hole 1B") has a clearance bigger than an assembly tolerance of fixing hole 1B and second fixing hole 2B (hereinafter referred to as "fixing hole 2B"). Besides, a clearance is generated between spacer 6 and first fixing section 1A by using bushing 8, so that effects similar to those in the third embodiment can be obtained. Furthermore, rubber ring 9 restrains play caused by the clearance, so that stability of the seat improves.

Figure 10:
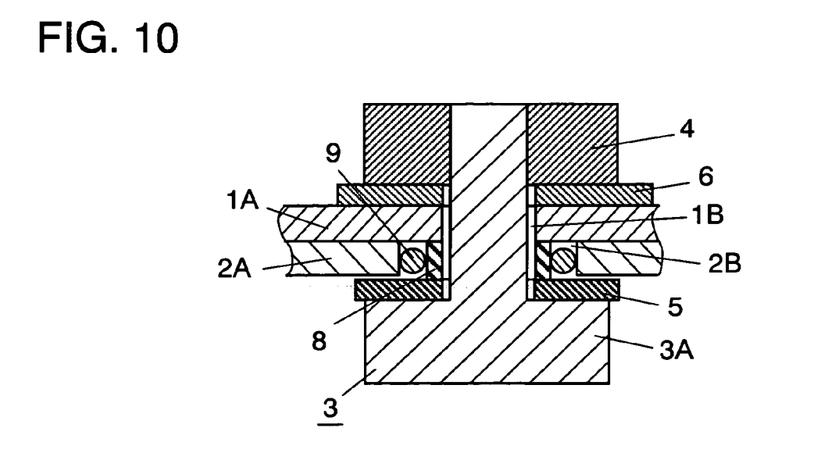
FIG. 10 is a sectional detail view of another fixing device in accordance with the fourth exemplary embodiment of the present invention.

In addition, as shown in FIG. 10, similar effects can be obtained in a case where rubber ring 9 is inserted outside bushing 8 in the structure shown in FIG. 8 of the third embodiment.

Fifth Exemplary Embodiment

Figures 11, 12:
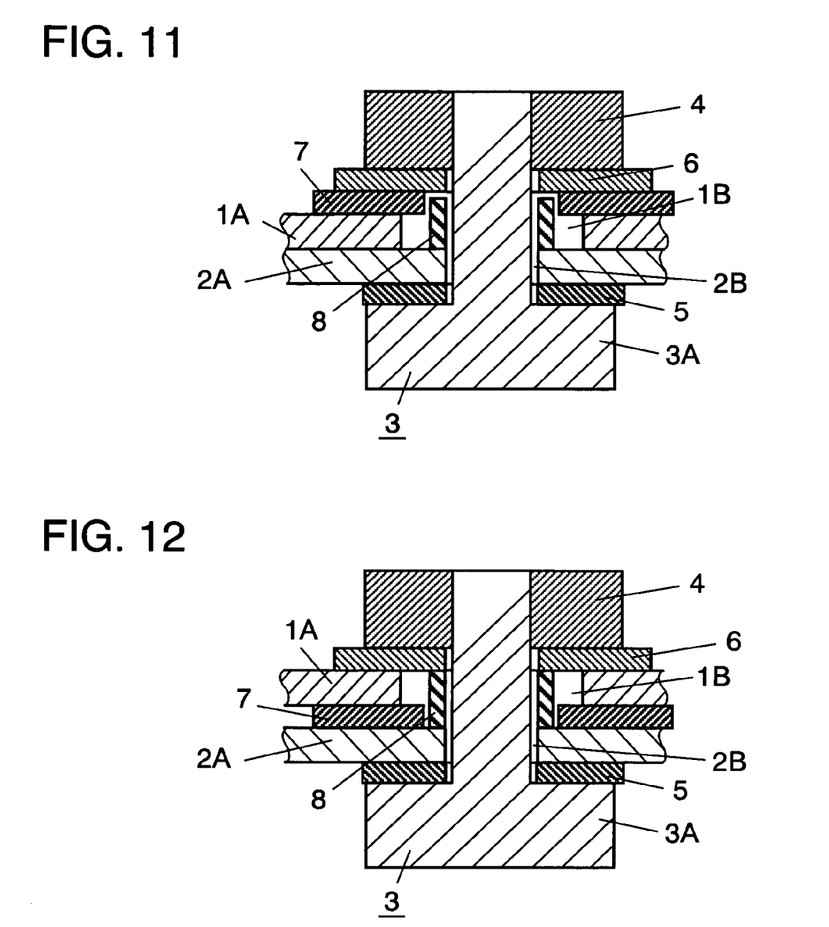
FIG. 11 is a sectional detail view of a fixing device in accordance with a fifth exemplary embodiment of the present invention.
FIG. 12 is a sectional detail view of another fixing device in accordance with the fifth exemplary embodiment of the present invention.
Figure 13:
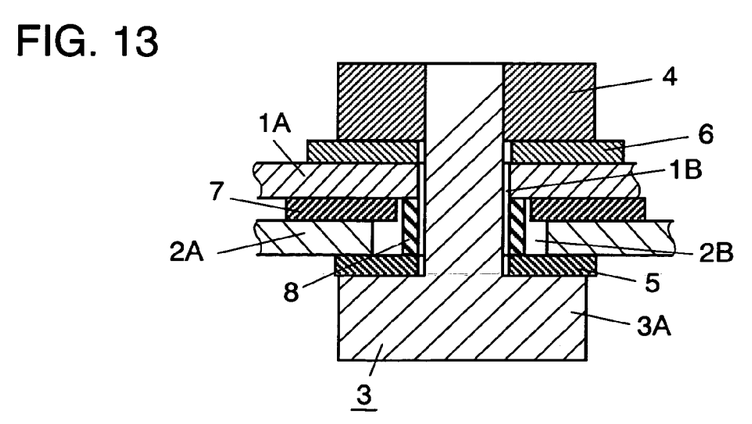
FIG. 13 is a sectional detail view of still another fixing device in accordance with the fifth exemplary embodiment of the present invention.
Figure 14:
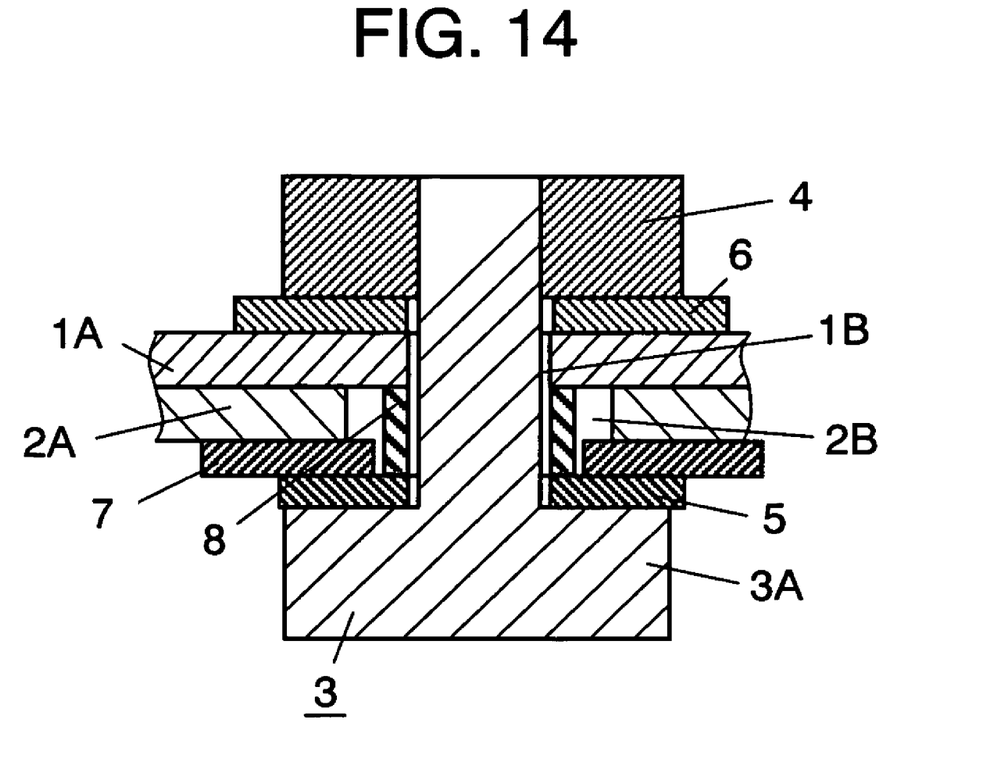
FIG. 14 is a sectional detail view of yet another fixing device in accordance with the fifth exemplary embodiment of the present invention.

FIG. 11 is a sectional detail view of a fixing device of a weight measuring apparatus in accordance with the fifth exemplary embodiment of the present invention. FIG. 12 is a sectional detail view of another fixing device in accordance with the fifth exemplary embodiment of the present invention. FIG. 13 is a sectional detail view of still another fixing device in accordance with the fifth exemplary embodiment of the present invention. FIG. 14 is a sectional detail view of yet another fixing device in accordance with the fifth exemplary embodiment of the present invention.

In FIGS. 11–14, in addition to the second embodiment, bushing 8 is inserted in first fixing hole 1B or second fixing hole 2B in a similar way to the third embodiment. Bushing 8 is smaller than the fixing hole in diameter, and thicker than the fixing section.

According to the third embodiment, bushing 8 is inserted in the structure described in the first embodiment. However, with the structure of this embodiment, a fixing device having effects as mentioned for the first, second and third embodiment can be obtained.

According to all embodiments discussed above, first fixing section 1A and second fixing section 2A are fastened with screw 3 and nut 4. However a bolt may be used instead of screw 3. In addition, instead of screw 3, a screw without a head may be used and fastened with a plurality of nuts at both sides. The present invention can also be realized using the method mentioned above.

Furthermore, at least one of spacers 5 and 6 is used in all embodiments discussed above. In general, a surface of a screw or a nut is not sufficiently flat but is instead rough. Therefore, when the screw or the nut is contacted with a fixing section, friction occurs. On the contrary, because the spacer is flat and has low surface roughness, friction is reduced, so that a fixing device can move smoothly. Therefore, when a measurement is taken using the weight measuring apparatus, measurement variations are restrained, so that highly accurate measurements can be taken. If surfaces, which are contacted with first fixing section 1A and second fixing section 2A, of screw 3 and nut 4 are produced to be flat and have low surface roughness, spacers 5 and 6 are not necessary.

INDUSTRIAL APPLICABILITY

As discussed above, the present invention provides a fixing device, which can accommodate constructive variations of a fixing section of a weight measuring apparatus and maintain excellent detecting accuracy, for fixing a weight measuring machine and a weight measuring apparatus using the same.

The invention claimed is:

1. A fixing device for a weight measuring apparatus, comprising:
a first fixing section constituting a weight applying member to be secured to a weight receiving part adapted to bear weight to be measured;
a second fixing section adapted to be secured to a weight measuring machine;
wherein said first fixing section has a first fixing hole formed therethrough;
wherein said second fixing section has a second fixing hole formed therethrough;
wherein a screw extends through said first fixing hole and said second fixing hole;
wherein said screw has a screw shaft, and a screw head at a first end portion of said screw shaft;
wherein a nut is threaded onto a second end portion of said screw shaft;
wherein said first fixing section and said second fixing section are secured onto said screw shaft between said screw head and said nut;
wherein at least one of said first fixing hole and said second fixing hole has an opening larger than said screw shaft by more than an assembly tolerance;
wherein one of said first and second fixing sections constitutes a top fixing section, and the other of said first and second fixing section constitutes a bottom fixing section; and
wherein said top fixing section is arranged vertically above said bottom fixing section, and said screw shaft is oriented generally vertically, so that the weight to be measured bears downwardly generally in an axial direction of said screw shaft.

2. The fixing device for a weight measuring apparatus, according to claim 1, wherein
one of said nut and said screw head constitutes a top securing part, and the other of said nut and said screw head constitutes a bottom securing part arranged below said top securing part; and
a spacer is provided about said screw shaft and is disposed in at least one of two locations including a first location between said top securing part and said top fixing section and a second location between said bottom securing part and said bottom fixing section.

3. The fixing device for a weight measuring apparatus, according to claim 1, wherein
an elastic body is provided about said screw shaft and between said nut and said screw head.

4. The fixing device for a weight measuring apparatus, according to claim 3, wherein
said elastic body is made of rubber.

5. The fixing device for a weight measuring apparatus, according to claim 1, wherein
a bushing is disposed in one of said first fixing hole and said second fixing hole; and
said bushing is thicker in an axial direction of said screw shaft than a thickness of the one of said first and second fixing sections in which said one of said first fixing hole and said second fixing hole is formed.

6. The fixing device for a weight measuring apparatus, according to claim 5, further comprising
a rubber ring arranged in said one of said first fixing hole and said second fixing hole outside of said bushing.

7. A weight measuring apparatus comprising:
a weight measuring machine; and
a fixing device including
a first fixing section constituting a weight applying member to be secured to a weight
receiving part adapted to bear weight to be measured,
a second fixing section secured to said weight measuring machine,
wherein said first fixing section has a first fixing hole formed therethrough, wherein said second fixing section has a second fixing hole formed therethrough, wherein a screw extends through said first fixing hole and said second fixing hole, wherein said screw has a screw shaft, and a screw head at a first end portion of said screw shaft, wherein a nut is threaded onto a second end portion of said screw shaft, wherein said first fixing section and said second fixing section are secured onto said screw shaft between said screw head and said nut, wherein at least one of said first fixing hole and said second fixing hole has an opening larger than said screw shaft by more than an assembly tolerance, wherein one of said first and second fixing sections constitutes a top fixing section, and the other of said first and second fixing section constitutes a bottom fixing section, and wherein said top fixing section is arranged vertically above said bottom fixing section, and said screw shaft is oriented generally vertically, so that the weight to be measured bears downwardly generally in an axial direction of said screw shaft.

8. The weight measuring apparatus, according to claim 7, wherein one of said nut and said screw head constitutes a top securing part, and the other of said nut and said screw head constitutes a bottom securing part arranged below said top securing part; and a spacer is provided about said screw shaft and is disposed in at least one of two locations including a first location between said top securing part and said top fixing section and a second location between said bottom securing part and said bottom fixing section.

9. The weight measuring apparatus, according to claim 7, wherein an elastic body is provided about said screw shaft and between said nut and said screw head.

10. The weight measuring apparatus, according to claim 9, wherein said elastic body is made of rubber.

11. The weight measuring apparatus, according to claim 7, wherein a bushing is disposed in one of said first fixing hole and said second fixing hole; and said bushing is thicker in an axial direction of said screw shaft than a thickness of the one of said first and second fixing sections in which said one of said first fixing hole and said second fixing hole is formed.

12. The weight measuring apparatus, according to claim 11, further comprising a rubber ring arranged in said one of said first fixing hole and said second fixing hole outside of said bushing.

13. An apparatus comprising:

a vehicle seat;

a weight measuring machine; and a fixing device coupling said vehicle seat to said weight measuring machine, said fixing device including a first fixing section constituting a weight applying member secured to said vehicle seat adapted to bear weight to be measured, a second fixing section secured to said weight measuring machine, wherein said first fixing section has a first fixing hole formed therethrough, wherein said second fixing section has a second fixing hole formed therethrough, wherein a screw extends through said first fixing hole and said second fixing hole, wherein said screw has a screw shaft, and a screw head at a first end portion of said screw shaft, wherein a nut is threaded onto a second end portion of said screw shaft, wherein said first fixing section and said second fixing section are secured onto said screw shaft between said screw head and said nut, wherein at least one of said first fixing hole and said second fixing hole has an opening larger than said screw shaft by more than an assembly tolerance, wherein one of said first and second fixing sections constitutes a top fixing section, and the other of said first and second fixing section constitutes a bottom fixing section, and wherein said top fixing section is arranged vertically above said bottom fixing section, and said screw shaft is oriented generally vertically, so that the weight to be measured bears downwardly generally in an axial direction of said screw shaft.

14. The apparatus, according to claim 13, wherein one of said nut and said screw head constitutes a top securing part, and the other of said nut and said screw head constitutes a bottom securing part arranged below said top securing part; and a spacer is provided about said screw shaft and is disposed in at least one of two locations including a first location between said top securing part and said top fixing section and a second location between said bottom securing part and said bottom fixing section.

15. The apparatus, according to claim 13, wherein an elastic body is provided about said screw shaft and between said nut and said screw head.

16. The apparatus, according to claim 15, wherein said elastic body is made of rubber.

17. The apparatus, according to claim 13, wherein a bushing is disposed in one of said first fixing hole and said second fixing hole; and said bushing is thicker in an axial direction of said screw shaft than a thickness of the one of said first and second fixing sections in which said one of said first fixing hole and said second fixing hole is formed.

18. The apparatus, according to claim 17, further comprising a rubber ring arranged in said one of said first fixing hole and said second fixing hole outside of said bushing.

19. The apparatus, according to claim 13, further comprising a vehicle body;

wherein said weight measuring machine is disposed on said vehicle body.

* * * * *